I. D. STINE.
ANCHOR SOCKET FOR SCREWS.
APPLICATION FILED DEC. 15, 1910.
1,007,747.
Patented Nov. 7, 1911.
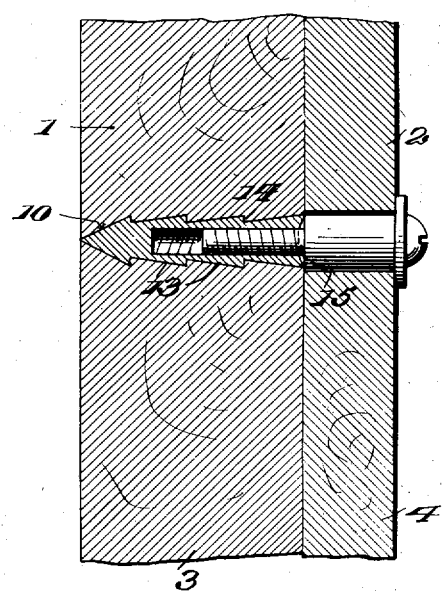
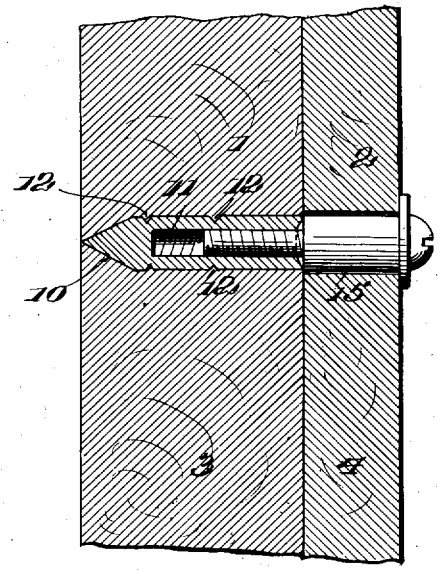
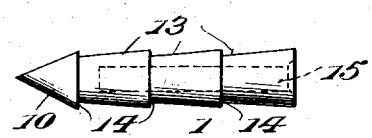
Witnesses
Inventor
Israel D. Stine
By Ira C. Graham,
Attorney

UNITED STATES PATENT OFFICE.

ISAAC D. STINE, OF DECATUR, ILLINOIS.

ANCHOR-SOCKET FOR SCREWS.

1,007,747.  Specification of Letters Patent.  Patented Nov. 7, 1911.

Application filed December 15, 1910. Serial No. 597,572.

*To all whom it may concern:*

Be it known that I, ISAAC D. STINE, a citizen of the United States, residing at Decatur, in the county of Macon and State of Illinois, have invented certain new and useful Anchor-Sockets for Screws, of which the following is a specification.

This invention relates to certain improvements in means for securing screws in wood, and more particularly to a metallic socket forming what might be termed a metal screw hole; and the objects and nature of the invention will be readily understood by those skilled in the art in the light of the following explanation of the accompanying drawings showing what I now consider my preferred embodiment.

An object of the invention is to produce a new article of manufacture consisting of a pointed metal bushing or pin having a longitudinal screw threaded socket or bore and adapted to be driven into a wooden article or structure at the point where a screw is to be located to form a socket or screw threaded hole for the reception of such screw and whereby the screw can be repeatedly removed and reinserted without injury to the wood work or screw hole.

The invention consists in a new article of manufacture, to wit;—a pointed metal pin formed to be driven into wood or the like, and having a longitudinal internal screw threaded socket to form a screw hole for the reception of a screw.

Referring to the accompanying drawings;—Figure 1, shows a jamb and a stop in section, the screw securing socket of my invention being shown in longitudinal section and secured in the jamb, and receiving a screw passed through the stop and shown in elevation. Fig. 2, is a detail elevation of the screw securing socket of Fig. 1. Fig. 3, is a view similar to Fig. 1, but showing a modified formation of screw securing socket.

The article of my invention consists of an elongated metal pin 1, formed in one piece of metal, and having a closed or solid pointed end 10, for driving into wood or other material in which a screw 2, is to be secured. This pin is formed with a longitudinal socket or bore 11, having a closed inner end and opening through the outer end or head of the pin. This socket is of a length and diameter to snugly receive the desired length of the threaded portion of the screw and is internally and longitudinally threaded to correspond to the gage and character of the thread of the screw and to properly hold the screw. The pin is of such external diameter as to provide sufficient strength and body to properly support the screw and sustain the strain and stress incidental to being forced into the wood by driving or hammering. The pin is usually approximately cylindrical in form, but is exteriorly formed for anchoring in the wood. For instance, the pin can be formed with external annular anchoring grooves 12, see Fig. 3, into which the wood (compressed by the entrance of the pin thereinto) can expand to firmly and rigidly lock or anchor the pin in the wood. However, I prefer, to form the pin with exterior annular anchoring depressions about as shown in the remaining figures of the drawings wherein the pin is externally formed with tapering portions 13, contracting toward the point of the pin and terminating at outwardly facing annular shoulders 14. To prevent injury to the internal screw thread by the impact of the hammer or other implement on the head or outer end of the pin in driving, I ream out or flare the outer end of the bore or socket of the pin, see 15, so that the internal screw thread begins at the inner end of the flared or enlarged portion of the bore and hence the thread will not be injured should the outer end or head of the pin be burred or slightly flattened by driving.

This article is particularly intended for use in connection with the screws by which window and door stops are secured to jambs and frames, and in other connections where the screws have to be repeatedly applied and removed for the adjustment of parts and the like, and in the drawings I show the pin driven into and buried in (except for its outer end face) a jamb 3, and receiving a screw 2, passed through a stop 4.

The article is usually applied by being driven into the jamb, frame or other part, after such jamb has had the point where the pin is to be located, marked thereon by inserting the screw in proper position in the stop and starting the screw point into the jamb. The pin is then driven into the jamb at the indentation thus marked by the screw point. Where this socket is employed, the screw can be removed and reapplied as often as required without marring the wood work or destroying the holding qualities of the screw hole.

What I claim is:—

A screw securing socket adapted to be driven into wood and consisting of a pin having a solid pointed inner end and a longitudinally threaded screw receiving bore open at the outer hammer blow sustaining end of the pin, and flared and free of screw threads at its outer end; said pin being externally formed between its point and outer end with anchoring depressions, substantially as described.

In testimony whereof I affix my signature in presence of two witnesses.

ISAAC D. STINE.

Witnesses:
ROSA VOELCKER,
E. S. MCDONALD.

---

Correction in Letters Patent No. 1,007,747.

It is hereby certified that in Letters Patent No. 1,007,747, granted November 7, 1911, upon the application of Isaac D. Stine, of Decatur, Illinois, for an improvement in "Anchor-Sockets for Screws," an error appears in the drawings requiring correction as follows: In Figures 1 and 3, from the reference-numeral "1" to the body of the screw-securing socket; from the reference-numeral "15" to the reamed-out or flared outer end of the screw-threaded bore of said socket, and from the reference-numeral "2" to the screw, *lead lines should be drawn;* and that the said Letters Patent should be read with this correction therein that the same may conform to the record of the case in the Patent Office.

Signed and sealed this 12th day of December, A. D., 1911.

[SEAL.]

E. B. MOORE,
*Commissioner of Patents.*

What I claim is:—

A screw securing socket adapted to be driven into wood and consisting of a pin having a solid pointed inner end and a longitudinally threaded screw receiving bore open at the outer hammer blow sustaining end of the pin, and flared and free of screw threads at its outer end; said pin being externally formed between its point and outer end with anchoring depressions, substantially as described.

In testimony whereof I affix my signature in presence of two witnesses.

ISAAC D. STINE.

Witnesses:
ROSA VOELCKER,
E. S. McDONALD.

---

Correction in Letters Patent No. 1,007,747.

It is hereby certified that in Letters Patent No. 1,007,747, granted November 7, 1911, upon the application of Isaac D. Stine, of Decatur, Illinois, for an improvement in "Anchor-Sockets for Screws," an error appears in the drawings requiring correction as follows: In Figures 1 and 3, from the reference-numeral "1" to the body of the screw-securing socket; from the reference-numeral "15" to the reamed-out or flared outer end of the screw-threaded bore of said socket, and from the reference-numeral "2" to the screw, *lead lines should be drawn;* and that the said Letters Patent should be read with this correction therein that the same may conform to the record of the case in the Patent Office.

Signed and sealed this 12th day of December, A. D., 1911.

[SEAL.]

E. B. MOORE,
*Commissioner of Patents.*

Correction in Letters Patent No. 1,007,747.

It is hereby certified that in Letters Patent No. 1,007,747, granted November 7, 1911, upon the application of Isaac D. Stine, of Decatur, Illinois, for an improvement in "Anchor-Sockets for Screws," an error appears in the drawings requiring correction as follows: In Figures 1 and 3, from the reference-numeral "1" to the body of the screw-securing socket; from the reference-numeral "15" to the reamed-out or flared outer end of the screw-threaded bore of said socket, and from the reference-numeral "2" to the screw, *lead lines should be drawn;* and that the said Letters Patent should be read with this correction therein that the same may conform to the record of the case in the Patent Office.

Signed and sealed this 12th day of December, A. D., 1911.

[SEAL.]

E. B. MOORE,
*Commissioner of Patents.*